(12) United States Patent
Shentu

(10) Patent No.: US 10,663,062 B2
(45) Date of Patent: May 26, 2020

(54) HIGH-PRECISION REAR-AXLE REDUCTION GEARBOX FOR SCOOTER

(71) Applicant: ZHEJIANG LINIX MOTOR CO., LTD., Dongyang, Zhejiang Province (CN)

(72) Inventor: Jun Shentu, Dongyang (CN)

(73) Assignee: ZHEJIANG LINIX MOTOR CO., LTD., Dongyang (CN)

( * ) Notice: Subject to any disclaimer, the term of this patent is extended or adjusted under 35 U.S.C. 154(b) by 209 days.

(21) Appl. No.: 15/871,751

(22) Filed: Jan. 15, 2018

(65) Prior Publication Data

US 2018/0208271 A1 Jul. 26, 2018

(30) Foreign Application Priority Data

Jan. 24, 2017 (CN) .......................... 2017 1 0052917

(51) Int. Cl.
*F16B 2/10* (2006.01)
*F16H 48/42* (2012.01)
(Continued)

(52) U.S. Cl.
CPC ...... *F16H 61/664* (2013.01); *B60K 2001/001* (2013.01); *B60K 2007/0061* (2013.01);
(Continued)

(58) Field of Classification Search
CPC .......... F16H 48/08; F16H 48/38; F16H 48/42; F16H 2048/082; F16H 57/021; F16H 57/022; F16H 57/023; F16H 2057/0216; F16H 2057/0235; B60K 23/04; B60K 2023/043; B60K 2023/046;
(Continued)

(56) References Cited

U.S. PATENT DOCUMENTS

| | | | | |
|---|---|---|---|---|
| 1,362,490 A | * | 12/1920 | Keck | ...................... B60K 17/08 74/329 |
| 2,701,972 A | * | 2/1955 | Hoffman | .................. F16H 48/08 74/607 |

(Continued)

FOREIGN PATENT DOCUMENTS

WO WO-2017030234 A1 * 2/2017 ............. B60K 17/12

*Primary Examiner* — David R Morris
*Assistant Examiner* — James J Taylor, III
(74) *Attorney, Agent, or Firm* — Jiwen Chen

(57) ABSTRACT

The present invention discloses a high-precision rear-axle reduction gearbox for a scooter, comprising a box body, wherein an inner chamber is formed within the box body, and an opening for communicating the inner chamber with the outside is formed on the box body; a cover for sealing the opening is fitted at the opening of the box body; output shaft hole for allowing an output shaft to pass therethrough and an input shaft hole for allowing an input shaft to pass therethrough are formed on the box body; a driving motor is provided outside the box body; a differential component is provided within the inner chamber of the box body; a driving motor output shaft of the driving motor is linked to an input shaft, and the input shaft is linked to an output shaft via the differential component; and, the opening is relatively located on a radial outer side of the output shaft, and the opening is deviated from the output shaft holes and the input shaft hole.

8 Claims, 5 Drawing Sheets

(51) Int. Cl.
    *F16H 48/08*     (2006.01)
    *F16H 48/40*     (2012.01)
    *F16H 57/038*     (2012.01)
    *B60K 1/00*     (2006.01)
    *B60K 7/00*     (2006.01)
    *B60K 17/16*     (2006.01)
    *F16H 61/664*     (2006.01)

(52) U.S. Cl.
    CPC ................ *F16B 2/10* (2013.01); *F16H 48/40* (2013.01); *F16H 48/42* (2013.01); *F16H 57/038* (2013.01); *F16H 2048/082* (2013.01)

(58) Field of Classification Search
    CPC ...... B60K 17/04–046; B60K 17/16–20; B60K 1/00; B60K 2001/001; F16B 2/00–18; F16B 21/00–20; F16B 2200/00–509
    See application file for complete search history.

(56) References Cited

U.S. PATENT DOCUMENTS

| | | | |
|---|---|---|---|
| 7,077,778 B1 * | 7/2006 | Irikura | F16H 48/08 475/230 |
| 2003/0040396 A1 * | 2/2003 | Berlinger | F16H 48/08 475/230 |
| 2005/0143213 A1 * | 6/2005 | Cross | B60K 1/00 475/252 |
| 2006/0040781 A1 * | 2/2006 | Cross | F16H 48/10 475/248 |

\* cited by examiner

HIGH-PRECISION REAR-AXLE REDUCTION GEARBOX FOR SCOOTER

This application claims the priority benefit of Chinese Application No. 201710052917.X, filed Jan. 24, 2017, which is hereby incorporated by reference.

TECHNICAL FIELD OF THE INVENTION

The present invention relates to a rear-axle reduction gearbox and in particular to a high-precision rear-axle reduction gearbox for a scooter.

BACKGROUND OF THE INVENTION

A reduction gearbox generally includes a box body and a cover, and shaft holes for allowing an output shaft to pass therethrough are provided on both the box body and the cover. Since the box body and the cover are two independent components, the shaft hole of the box body and the shaft hole of the cover are machined separately. Therefore, high requirements are proposed on the machining process, the time for machining is long, and the high-precision coaxiality of the shaft hole of the box body and the shaft hole of the cover cannot be guaranteed.

SUMMARY OF THE INVENTION

An object of the present invention is to provide a high-precision rear-axle reduction gearbox for a scooter.

For this purpose, the present invention employs the following technical solutions. A high-precision rear-axle reduction gearbox for a scooter is provided, comprising a box body, wherein an inner chamber is formed within the box body, and an opening for communicating the inner chamber with the outside is formed on the box body; a cover for sealing the opening is fitted at the opening of the box body; output shaft hole for allowing an output shaft to pass therethrough and an input shaft hole for allowing an input shaft to pass therethrough are formed on the box body; a driving motor is provided outside the box body; a differential component is provided within the inner chamber of the box body; a driving motor output shaft of the driving motor is linked to an input shaft, and the input shaft is linked to an output shaft via the differential component; and, the opening is relatively located on a radial outer side of the output shaft, and the opening is deviated from the output shaft holes and the input shaft hole.

Since the output shaft in the present invention does not pass through the cover, no output shaft hole needs to be machined on the cover, and it is only required to machine output shaft holes on the box body. Accordingly, the precision of the shaft holes can be ensured to the greatest extent, and both the machining cost and the machining duration is reduced. Moreover, since the box body of the present invention is of an integrated structure, the machining precision of the output shaft holes is greatly improved, and the production cost is reduced. The output shaft holes are used for allowing the output shaft to pass through the box body; and, the input shaft hole is used for fixing the input shaft to link to the driving motor, or the input shaft hole is used for allowing an output shaft of the driving motor to extend into the box body to link to the output shaft of the box body.

Preferably, the output shaft includes a first output shaft and a second output shaft; one end of the first output shaft and one end of the second output shaft are fixed within the box body, and the other end of the first output shaft and the other end of the second output shaft extend outside the box body through one output shaft hole, respectively; the first output shaft and the second output shaft are linked via the differential component fixed within the box body; the differential component includes a first gear fixed on the first output shaft and a second gear fixed on the second output shaft; a wedge component is arranged on the output shaft; and, the wedge component is arranged on the first output shaft, and the wedge component is restricted between an inner wall of the box body and the first gear; or, the wedge component is arranged on the second output shaft, and the wedge component is restricted between the inner wall of the box body and the second gear.

The reduction gearbox of the present invention has two output shafts. Since the opening of the box body is located at a position on the radial outer side of the output shafts, gears (the differential component) within the box body cannot be assembled by an existing assembly method. During the assembly of the differential component of the present invention, one output shaft may be fixed first by a bearing, and a gap for allowing the gears to pass therethrough is formed between the two output shafts; then, the gears of the differential component are placed within an assembly space of the box body through the opening of the box body, and parts of the gears of the differential component are sheathed on the output shafts through the gap between the two output shafts. To ensure the axial limiting of the differential component on the output shaft, in the present invention, by sheathing a wedge component on the first output shaft or the second output shaft and arranging the wedge component between the inner wall of the box body and the gears of the differential component, a space within which the differential component moves in the axial direction of the output shaft is decreased, and the axial limiting of the differential component is thus realized. When there is only one output shaft on the box body in the present invention, neither differential component nor wedge component is required. There should be a gap between two output shafts in order to avoid the mutual interference of the two output shafts.

Preferably, the wedge component comprises a first block and a second block; arc-shaped openings are formed on both the first block and the second block; one end of the first block is hinged and fixed with one end of the second block via a hinge shaft; an axis of the hinge shaft is parallel to an axis of the output shaft; the other end of the first block is fixed with the other end of the second block via a fastener; and, the wedge component is fixed with the output shaft, and the first block and the second block are located on two radial opposite sides of the output shaft, respectively.

The arrangement is convenient for the assembly of the wedge component so as to realize the axial limiting of the differential component. After the differential component is assembled, the wedge component is placed into the assembly space of the box body from the opening of the box body, and the wedge component is sheathed on the first output shaft or the second output shaft. Subsequently, one end of the first block and one end of the second block of the wedge component away from a hinge joint are folded, and the wedge component is rotated on the output shaft to adjust the position of the hinge joint of the wedge component. Finally, a fastener is assembled to fix the wedge component onto the output shaft. The thickness of the wedge component is selected as desired, so that the axial end faces of the wedge component are resisted against the inner wall of the box body and the differential component, respectively.

Preferably, the first output shaft and the second output shaft are arranged coaxially; the input shaft is fixed within the box body; an axis of the input shaft is parallel to an axis of the first output shaft; the input shaft is linked to a linkage gear; a third gear and a fourth gear arranged in opposite are fixed within the linkage gear; both an axis of the third gear and an axis of the fourth gear are perpendicular to a plane of an axis of the linkage gear; the linkage gear is sheathed on the output shaft, and the third gear and the fourth gear are located on two radial opposite sides of the output shaft, respectively; and, both the first gear and the second gear are meshed with the third gear, both the first gear and the second gear are meshed with the fourth gear, and all the first gear, the second gear, the third gear and the fourth gear are bevel gears. The input shaft may be an output shaft of the driving motor, or may be a shaft linked to the output shaft of the driving motor. Threads may be provided on the input shaft to realize the meshing with the linkage gear, or a gear for meshing with the linkage gear may be fixed on the input shaft. The rotation of the driving motor pushes the input shaft to drive the rotation of the linkage gear, and the first gear and the second gear are driven to rotate by the third gear and the fourth gear, so that the rotation of the first output shaft and the second output shaft is realized.

Preferably, two first through grooves are formed on the linkage gear; the third gear and the fourth gear are fixed within the first through grooves, respectively; both the third gear and the fourth gear are restricted between the first gear and the second gear; each of the first through grooves is communicated with one second through groove; both the third gear and the fourth gear are sheathed outside one fixed shaft; one second through groove is matched with one fixed shaft, at least one end of each of the fixed shafts is located within the second through groove, and a portion of the fixed shaft located within the second through groove and the second through groove form planes matched with each other; the plane of each of the fixed shafts is matched with the plane of each of the second through grooves to realize the radial fixation of the fixed shaft; and, bevel gear bearings are provided between the third gear and the fixed shafts and between the fourth gear and the fixed shafts. By fitting the fixed shafts and the bevel gear bearings with the bevel gear on the linkage gear, the other output shaft can still be rotated when one output shaft is locked, so as to realize the steering of the scooter; and, the unlocked output shaft can be rotated at a double speed. The fixed shafts may be square shafts having four planes, or single-plane shafts having only one plane, or two-plane shafts having two opposite planes. The positions of the third gear and the fourth gear are limited by the first gear and the second gear, and the positions of the two fixed shafts are also limited.

Preferably, the first output shaft and the second output shaft are arranged coaxially; the input shaft is fixed within the box body; an axis of the input shaft is parallel to an axis of the first output shaft; the input shaft is linked to a linkage gear; a third gear and a fourth gear arranged in opposite are fixed within the linkage gear; both an axis of the third gear and an axis of the fourth gear are perpendicular to a plane of an axis of the linkage gear; the linkage gear is sheathed on the output shaft, and the third gear and the fourth gear are located on two radial opposite sides of the output shaft, respectively; and, both the first gear and the second gear are meshed with the third gear, both the first gear and the second gear are meshed with the fourth gear, and all the first gear, the second gear, the third gear and the fourth gear are bevel gears. The first gear is positioned by the first pin, the second gear is positioned by the second pin, and the axial fixation of the first gear and the second gear on the output shafts is realized by the third gear and the fourth gear.

Preferably, one side end face of the linkage gear engages against a positioning sleeve, while the other side end face of the linkage gear engages against the first gear or the second gear; both the positioning sleeve and the linkage gear are sheathed on a same output shaft; and the positioning sleeve is located between the first gear and the second gear. When the linkage gear is sheathed on the first output shaft, the positioning sleeve is arranged on the first output shaft; one side end face of the linkage gear engages against one side end face of the positioning sleeve, while the other side end face thereof engages against the second gear; and the other side end face of the positioning sleeve engages against the first gear. When the linkage gear is sheathed on the second output shaft, the positioning sleeve is arranged on the second output shaft; one side end face of the linkage gear engages against the positioning sleeve, while the other side end face thereof engages against the first gear; and the other side end face of the positioning sleeve engages against the second gear. In the present invention, the axial limiting and fixation of the linkage gear are realized by providing the positioning sleeve. Teeth on each bevel gear are arranged on an outer edge of one side end face, and an inner edge of the end face of the bevel gear with teeth is a plane. One side end face of the positioning sleeve away from the linkage gear engages against the plane of the inner edge of one bevel gear, and one side end face of the linkage gear away from the positioning sleeve engages against the plane of the inner edge of one bevel gear.

Preferably, each of the first block and the second block includes an arc-shaped clamping portion, a hinge fixation portion at one end of the clamping portion and a fastener fixation portion at the other end of the clamping portion; the thickness of the clamping portion of the first block is consistent with the thickness of the clamping portion of the second block; the sum of the value of the thickness of the hinge fixation portion of the first block and the value of the thickness of the hinge fixation portion of the second block is less than or equal to the value of the thickness of the clamping portion of the first block; the fastener fixation portion of the first block and the fastener fixation portion of the second block are fixed together to close the arc-shaped opening of the first block and the arc-shaped opening of the second block to form an inner hole having a circular cross-section in the radial direction of the output shaft; and, the wedge component is in clearance fit with the output shaft. In the present invention, by setting the thickness of the hinge portion of the first block and the thickness of the hinge portion of the second block, the clamping portion of the first block and the clamping portion of the second block may be located on two opposite sides of the radial direction of the output shaft, and the first gear or the second gear may come into contact with a plane (an end face of the clamping portion of the first block and an end face of the clamping portion of the second block) so as to realize the axial limiting of the gears of the differential component. By sealing the arc-shaped opening of the first block by the second block and sealing the arc-shaped opening of the second block by the first block, the first block and the second block are cooperated to form a circular inner hole for being sheathed on the output shaft. The thickness of the first block and the second block is a distance in the axial direction after the wedge component is sheathed on the output shaft.

Preferably, a first fixation portion and a second fixation portion both extending outside the box body and having a circular inner edge of the radial cross-section are formed at two opposite ends of the box body, respectively; the first output shaft is fixed with the first fixation portion by several output shaft bearings; the second output shaft is fixed with the second fixation portion by several output shaft bearings; a sleeve is sheathed on the first output shaft or the second output shaft; the sleeve and the first fixation portion or the second fixation portion form stopper structures matched with each other, and the other end of the sleeve and a fixed seat form stopper structures matched with each other; the fixed seat is fixed with the fixation portions; and, the sleeve is restricted between the fixed seat and the first fixation portion or the second fixation portion. By such an arrangement, the size of the assembly space of the box body is reduced, and the present invention can adapt to scooters having different wheel treads. This purpose is achieved by replacing output shafts and sleeves of different lengths. The fixation portion is a vehicle frame.

Preferably, a first oil seal is provided at an end of the first fixation portion away from the second fixation portion, a second oil seal is provided at an end of the second fixation portion away from the first fixation portion, and the output shaft bearings are needle bearings. In the present invention, by fixing one end of the output shaft by several needle bearings, the size of the box body can be reduced since the width of the needle bearings in the radial direction of the output shaft is small.

Since the box body in the present invention is of an integrated structure and both the output shaft holes and the input shaft hole are formed on the box body, the precision of the output shaft holes can be improved and the noise of the reduction gearbox when in use can be reduced. Meanwhile, since it is only required to machine shaft holes on the box body and no output shaft hole needs to be machined on the cover, the processing duration of the reduction gearbox may be shortened and the machining cost can be reduced. In the present invention, by providing a wedge component on the first output shaft or the second output shaft, the axial limiting and fixation of the differential component within the box body are realized; by resisting components such as gears against one another and resisting the components against the inner wall of the box body, the axial limiting and fixation of the differential component and the wedge component within the box body are realized. Since the axial gaps between adjacent components are very mall, the assembly space of the box body in the axial direction of the output shaft can be decreased, and the inner structure of the box body becomes more compact. As a result, the assembly space of the box body becomes smaller, and the size of both the box body and the cover of the present invention becomes smaller, so that the usage of the cast material for the reduction gearbox is greatly decreased. Moreover, since the assembly space of the box body becomes smaller, grease covered on the inner wall of the box body for lubricating the gears becomes less, and the usage of the lubricating grease can be reduced.

DETAILED DESCRIPTION OF THE INVENTION

Figure 1:
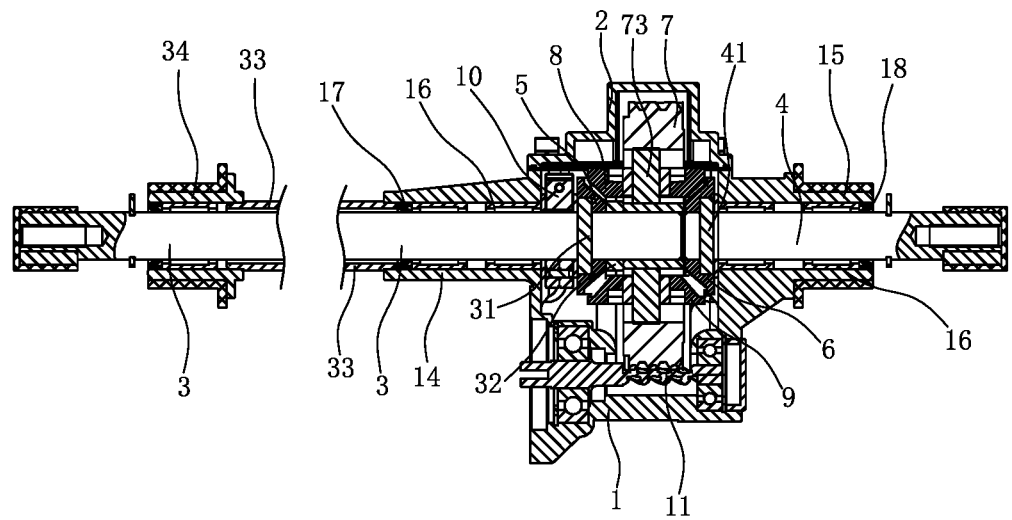
FIG. 1 is a sectional view of a reduction gearbox according to the present invention.
Figure 2:
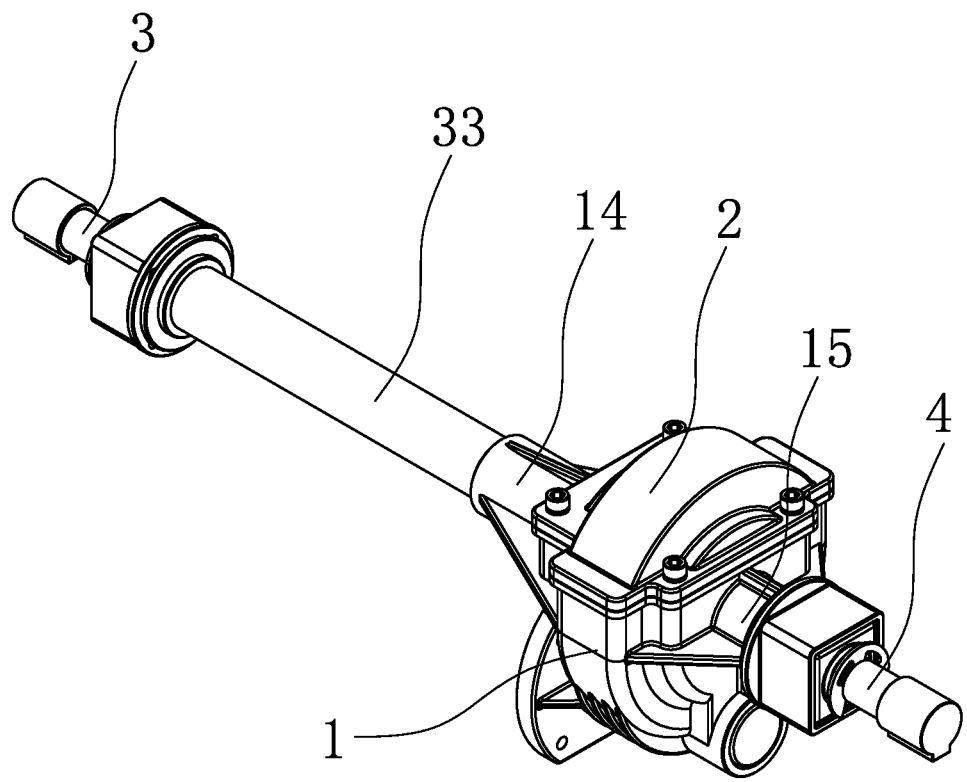
FIG. 2 is an axial side view of the reduction gearbox according to the present invention.
Figure 3:
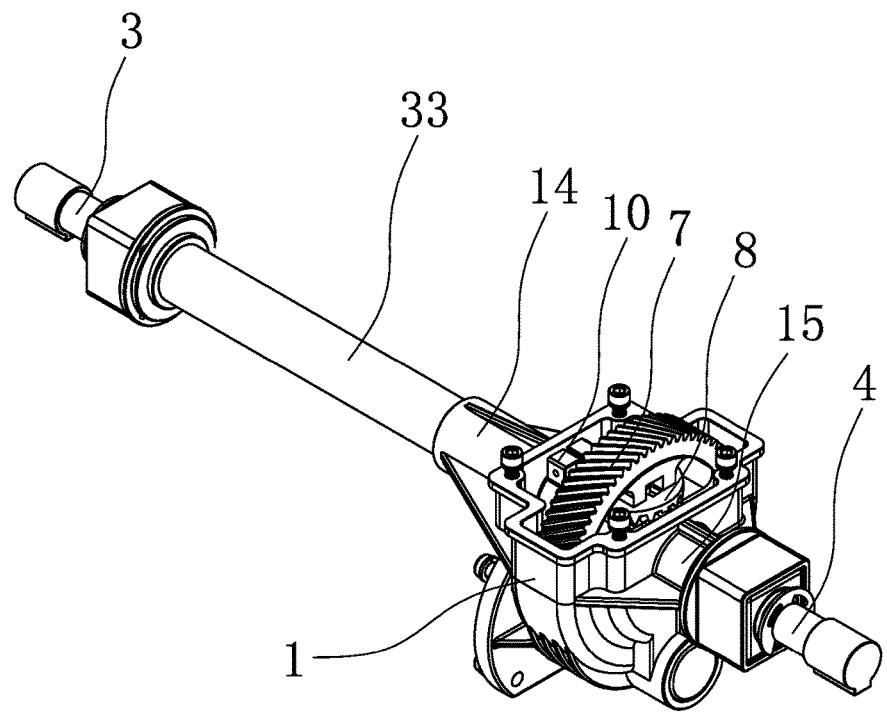
FIG. 3 is a structural diagram of a box body according to the present invention.
Figure 4:
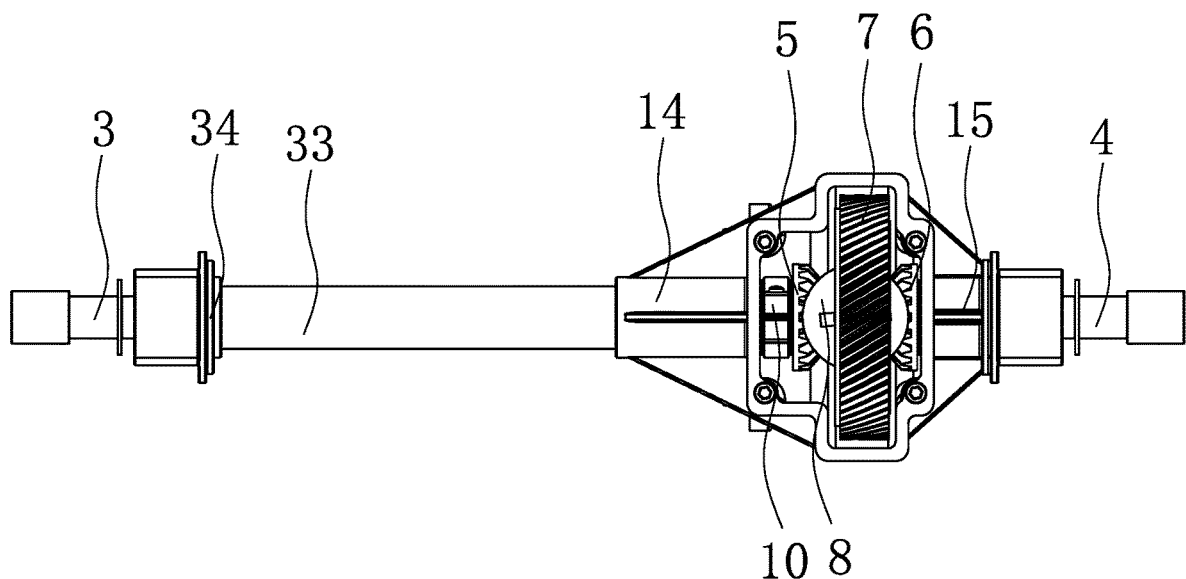
FIG. 4 is another structural diagram of the box body according to the present invention.
Figure 5:
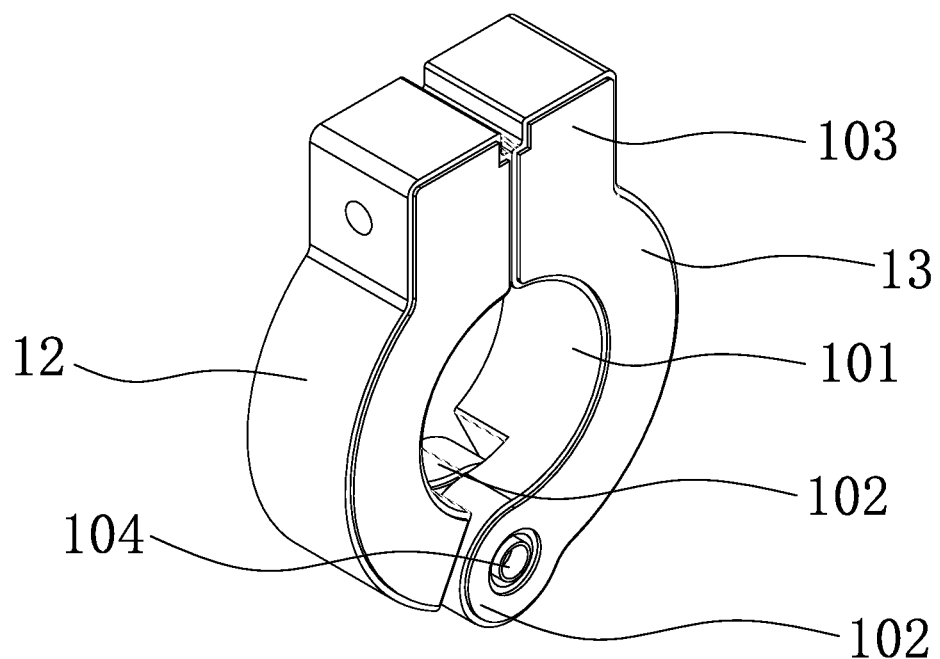
FIG. 5 is a structural diagram of a wedge component according to the present invention.
Figure 6:
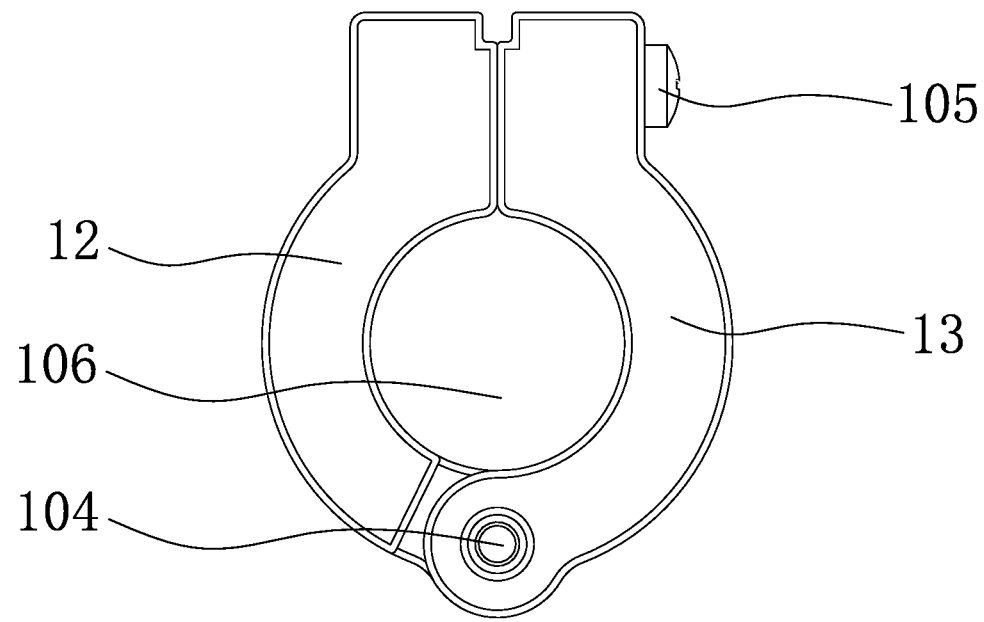
FIG. 6 is another structural diagram of the wedge component according to the present invention.

The present invention will be further described below by specific embodiments with reference to accompanying drawings.

As shown in FIGS. 1, 2, 3 and 4, a high-precision rear-axle reduction gearbox for a scooter is provided, including a box body 1 and an output shaft. A portion of the box body 1 corresponding to a radial outer side of the output shaft is formed with an opening and fitted with a cover 2. Output shaft holes and an input shaft hole are formed on the box body 1. An inner chamber is formed within the box body 1, and an opening for communicating the inner chamber with the outside is formed on the box body 1. The cover 2 for sealing the opening is fitted at the opening of the box body 1. Output shaft holes for allowing an output shaft to pass therethrough and an input shaft hole for allowing an input shaft to pass therethrough are formed on the box body 1. A driving motor is provided outside the box body 1. A differential component is provided within the inner chamber of the box body 1. A driving motor output shaft of the driving motor is linked to an input shaft, and the input shaft is linked to an output shaft via the differential component. The opening is relatively located on a radial outer side of the output shaft, and the opening is deviated from the output shaft holes and the input shaft hole.

The output shaft includes a first output shaft 3 and a second output shaft 4 which are arranged coaxially. One end of the first output shaft 3 and one end of the second output shaft 4 are fixed within the box body 1, while the other end of the first output shaft 3 and the other end of the second output shaft 4 extend outside the box body 1 through one output shaft hole, respectively. The first output shaft 3 and the second output shaft 4 are linked via the differential component fixed within the box body 1. The first output shaft 3 is a long shaft, and the second output shaft 4 is a short shaft. There is a gap between the two shafts to avoid mutual interference. One end of each of the two shafts away from the box body is fixed with a rear wheel of a scooter.

As shown in FIGS. 1, 3, 4, 7 and 8, the differential component includes a first gear 5 fixed on the first output shaft 3 and a second gear 6 fixed on the second output shaft 4. An input shaft 11 is fixed within the box body 1, a linkage gear 7 is sheathed on the first output shaft 3, and threads for meshing with the linkage gear 7 are formed on the input shaft 11. A third gear 8 and a fourth gear 9 arranged in opposite are fixed within the linkage gear 7. Both an axis of the third gear 8 and an axis of the fourth gear 9 are perpendicular to a plane of an axis of the linkage gear 7. The third gear 8 and the fourth gear 9 are located on two radial opposite sides of the first output shaft 3, respectively. Both the first gear 5 and the second gear 6 are meshed with the third gear 8, and both the first gear 5 and the second gear 6 are meshed with the fourth gear 9. All the first gear 5, the second gear 6, the third gear 8 and the fourth gear 9 are bevel gears.

Figure 8:
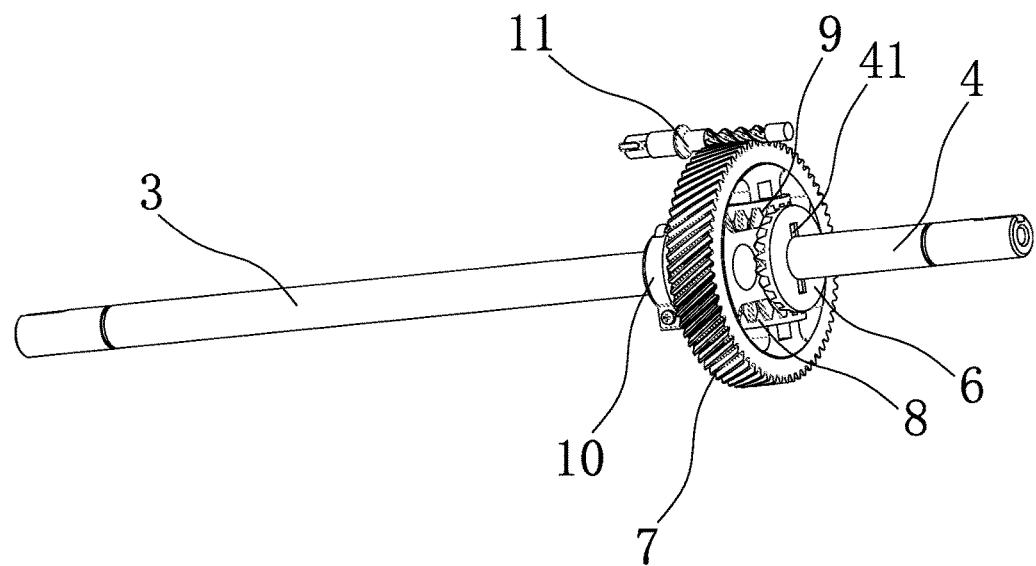
FIG. 8 is another structural diagram of the differential component according to the present invention.
Figure 9:
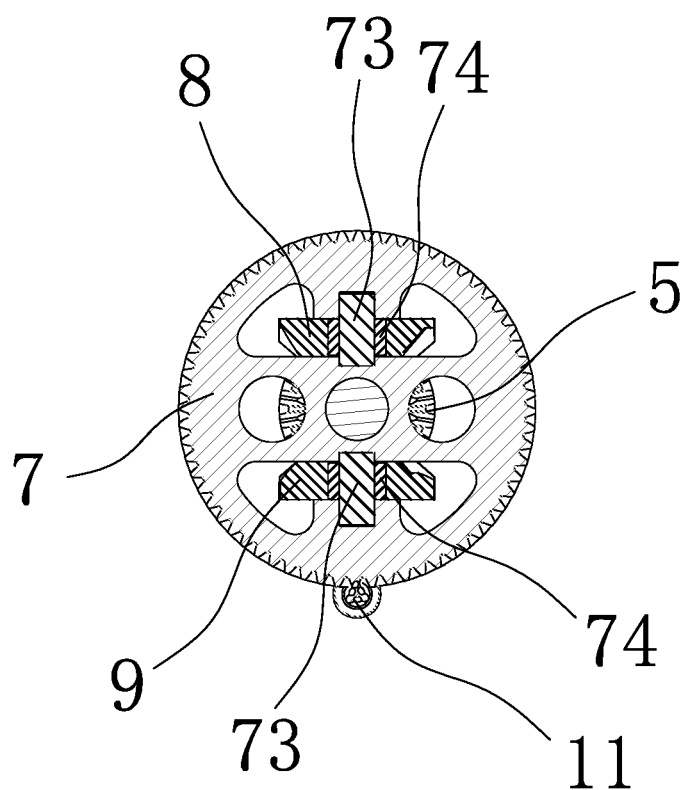
FIG. 9 is a view of FIG. 7 taken along A-A.
Figure 10:
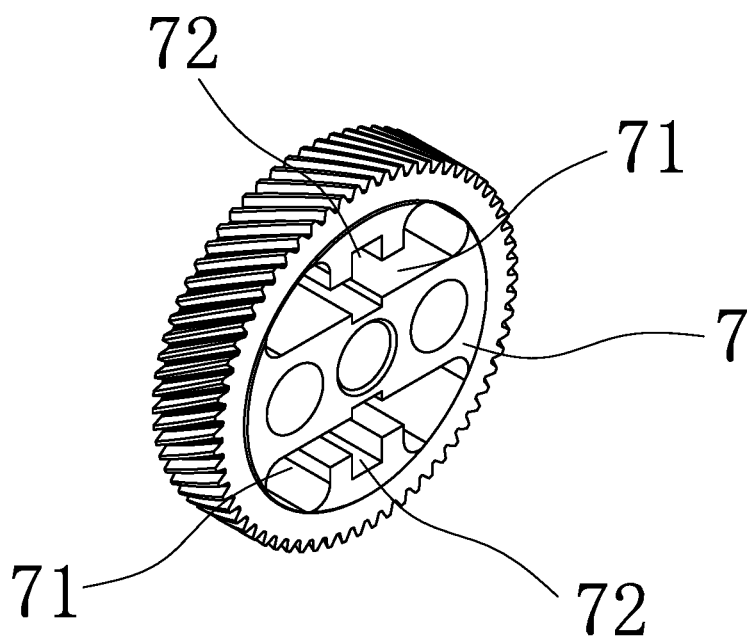
FIG. 10 is a structural diagram of a linkage gear according to the present invention.

As shown in FIGS. 1 and 8, pin holes are formed in a portion of the first output shaft 3 and a portion of the second output shaft 4 both located within the box body. A first pin 31 is fitted within the pin hole of the first output shaft 3, and a second pin 41 is fitted within the pin hole of the second output shaft 4. Bevel teeth are formed on one side end face of the first gear 5, and a first pin accommodating groove for accommodating the first pin 31 is formed on the other side end face of the first gear 5. Bevel teeth are formed on one side end face of the second gear 6, and a second pin accommodating groove for accommodating the second pin 41 is formed on the other side end face of the second gear 6. The pin holes on the first output shaft 3 and the second output shaft 4 are through holes. The length of the first pin 31 is greater than the diameter of the first output shaft 3, and the length of the second pin 41 is greater than the diameter of the second output shaft 4.

As shown in FIGS. 3, 8, 9 and 10, two first through grooves 71 arranged in opposite are formed on the linkage gear 7. The third gear 8 and the fourth gear 9 are fixed within the first through grooves 71, respectively. Both the third gear 8 and the fourth gear 9 are restricted between the first gear 5 and the second gear 6. Each of the first through grooves 71 is communicated with one second through groove 72, and the first through groove 71 and the second through groove 72 form a cross-shaped groove. Both the third gear 8 and the fourth gear 9 are sheathed outside one fixed shaft 73. One second through groove 72 is matched with one fixed shaft 73. Bevel gear bearings 74 are provided between the third gear 8 and the fixed shafts 73 and between the fourth gear 9 and the fixed shafts 73. Four walls of each second through groove 72 are planes, the fixed shafts 73 are square shafts, and the bevel gear bearings 74 are oil-contained bearings.

As shown in FIGS. 1, 3, 4, 5 and 6, a wedge component 10 is provided on the first output shaft 3, and the wedge component 10 is restricted between the inner wall of the box body 1 and the first gear 5. The wedge component 10 includes a first block 12 and a second block 13. Each of the first block 12 and the second block 13 includes an arc-shaped clamping portion 101, a hinge fixation portion 102 at one end of the clamping portion 101, and a fastener fixation portion 103 at the other end of the clamping portion 101. The thickness of the clamping portion 101 of the first block 12 is consistent with the thickness of the clamping portion 101 of the second block 13, and the sum of the value of the thickness of the hinge fixation portion 102 of the first block 12 and the value of the thickness of the hinge fixation portion 102 of the second block 13 is less than the value of the thickness of the clamping portion 101 of the first block 12. The hinge fixation portion 102 of the first block 12 and the hinge fixation portion 102 of the second block 13 hinge the first block 12 and the second block 13 via a hinge shaft 104, and an axis of the hinge shaft 104 is parallel to the axis of the first output shaft 3. The fastener fixation portion 103 of the first block 12 and the fastener fixation portion 103 of the second block 13 are fixed together to close the arc-shaped opening of the first block 12 and the arc-shaped opening of the second block 13. The fastener fixation portion 103 of the first block 12 and the fastener fixation portion 103 of the second block 13 are fixed together via screws 105, and the first block 12 and the second block 13 are fixed to form an inner hole 106 having a circular cross-section in the radial direction of the output shaft. The wedge component 10 is in clearance fit with the first output shaft 3, and the first block 12 and the second block are located on two radial opposite sides of the first output shaft, respectively.

Figure 7:
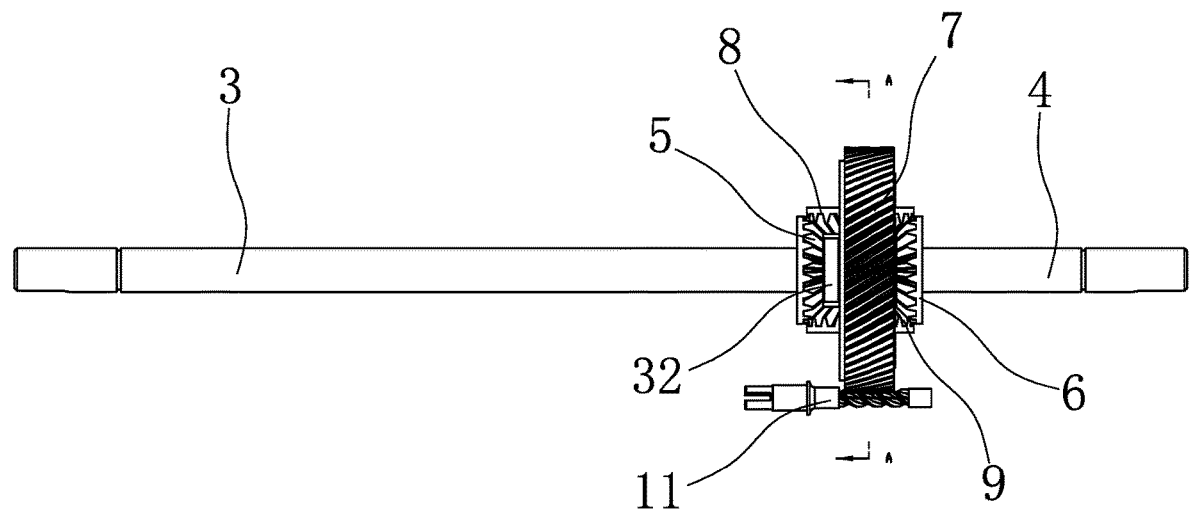
FIG. 7 is a structural diagram of a differential component according to the present invention.

As shown in FIGS. 1 and 7, a positioning sleeve 32 is sheathed on the first output shaft 3. One side end face of the positioning sleeve 32 engages against the first gear 5, while the other side end face of the positioning sleeve 32 engages against one side end face of the linkage gear 7; and the other side end face of the linkage gear 7 engages against the second gear 6.

As shown in FIGS. 1, 2, 3 and 4, a first fixation portion 14 and a second fixation portion 15 both extending outside the box body and having a circular inner edge of the radial cross-section are formed at two opposite ends of the box body 1, respectively. The first output shaft 3 is fixed with the first fixation portion 14 by two output shaft bearings 16, and the second output shaft 4 is fixed with the second fixation portion 14 by two output shaft bearings 16. A sleeve 33 is sheathed on the first output shaft 3. The sleeve 33 and the first fixation portion 14 form stopper structures matched with each other, and the other end of the sleeve 33 and a fixed seat 34 form stopper structures matched with each other. The fixed seat 34 is fixed with the fixation portions, and the sleeve 33 is restricted between the fixed seat 34 and the first fixation portion 14. A first oil seal 17 is provided at an end of the first fixation portion 14 away from the second fixation portion 15, a second oil seal 18 is provided at an end of the second fixation portion 15 away from the first fixation portion 14, and the output shaft bearings 16 are needle bearings.

During the assembly of the reduction gearbox of the present invention, the input shaft 11, the first output shaft 3 and the second output shaft 4 are assembled first, and a space for allowing the gears to pass therethrough is reserved between the first output shaft 3 and the second output shaft 4; then, the differential component and the wedge component are assembled through the opening of the box body 1; and finally, the opening of the box body 1 is sealed by the cover 2, and the input shaft 11 of the box body 1 is linked to the driving motor. The first pin 31 is inserted into the pin hole of the first output shaft 3, and two ends of the first pin 31 are located outside the pin hole. Subsequently, the first gear 5 is sheathed on the first output shaft, and the two ends of the first pin 31 are located within the first pin accommodating groove of the first gear. By repeating the above operation, the second gear 6 is located on the second output shaft 4. Before the sheathing of the linkage gear 7, the positioning sleeve 33 is sheathed on the first output shaft 3. After the third gear 8 and the fourth gear 6 are arranged on the linkage gear, the second gear 6 is moved, the third gear 8 is meshed with the first gear 5 and the second gear 6, the fourth gear 9 is meshed with the first gear 5 and the second gear 6, and the second gear 6 engages against the linkage gear 7. The wedge component 10 is placed within the assembly space of the box body 1 from the opening of the box body 1, and the wedge component 10 is sheathed on the first output shaft 3. Then, the fastener fixation portion 103 of the first block 12 and the fastener fixation portion 103 of the second block 13 of the wedge component 10 are folded, and the first block 12 and the second block 13 are fixed by screws 105. In this case, the wedge component 10 is in clearance fit with the first output shaft 3, and two side end faces of the wedge component are resisted against the inner wall of the box body 1 and the first gear 5, respectively. Two gaskets may be sheathed on the first output shaft, and the wedge component 10 is located between the two gaskets; a gasket is sheathed on the second output shaft, and the gasket on the second output shaft is located between the second gear 6 and the inner wall of the box body 1.

Since the box body in the present invention is of an integrated structure and both the output shaft holes and the input shaft hole are formed on the box body, the precision of the output shaft holes can be improved and the noise of the reduction gearbox when in use can be reduced. Meanwhile, since it is only required to machine shaft holes on the box body and no output shaft hole needs to be machined on the cover, the processing duration of the reduction gearbox may be shortened and the machining cost can be reduced. In the present invention, by providing a wedge component on the first output shaft or the second output shaft, the axial limiting and fixation of the differential component within the box body are realized; by resisting components such as gears against one another and resisting the components against the inner wall of the box body, the axial limiting and fixation of the differential component and the wedge component within the box body are realized. Since the axial gaps between adjacent components are very mall, the assembly space of the box body in the axial direction of the output shaft can be decreased, and the inner structure of the box body becomes more compact. As a result, the assembly space of the box body becomes smaller, and the size of both the box body and the cover of the present invention becomes smaller, so that the usage of the cast material for the reduction gearbox is greatly decreased. Moreover, since the assembly space of the box body becomes smaller, grease covered on the inner wall of the box body for lubricating the gears becomes less, and the usage of the lubricating grease can be reduced.

The invention claimed is:

1. A high-precision rear-axle reduction gearbox for a scooter, comprising a box body, characterized in that an inner chamber is formed within the box body, and an opening for communicating with the inner chamber is formed on the box body; a cover for sealing the opening is fitted at the opening of the box body; output shaft holes for allowing an output shaft to pass therethrough and an input shaft hole for allowing an input shaft to pass therethrough are formed on the box body; a differential component is provided within the inner chamber of the box body; the input shaft is linked to the output shaft via the differential component; and, the opening is relatively located on a radial outer side of the output shaft, and the opening is deviated from the output shaft holes and the input shaft hole;

characterized in that the output shaft comprises a first output shaft and a second output shaft; one end of the first output shaft and one end of the second output shaft are fixed within the box body, and the other end of the first output shaft and the other end of the second output shaft extend outside the box body through one output shaft hole, respectively; the first output shaft and the second output shaft are linked via the differential component fixed within the box body; the differential component comprises a first gear fixed on the first output shaft and a second gear fixed on the second output shaft;

characterized in that a wedge component is arranged on the first output shaft, and the wedge component is restricted between an inner wall of the box body and the first gear; or, the wedge component is arranged on the second output shaft, and the wedge component is restricted between the inner wall of the box body and the second gear; and characterized in that the wedge component comprises a first block and a second block; arc-shaped openings are formed on both the first block and the second block; one end of the first block is hinged and fixed with one end of the second block via a hinge shaft; an axis of the hinge shaft is parallel to an axis of the output shaft; the other end of the first block is fixed with the other end of the second block via a fastener; and, the wedge component is fixed with the output shaft, and the first block and the second block are located on two radial opposite sides of the output shaft, respectively.

2. The high-precision rear-axle reduction gearbox for a scooter according to claim 1, characterized in that the first output shaft and the second output shaft are arranged coaxially; the input shaft is fixed within the box body; an axis of the input shaft is parallel to an axis of the first output shaft; the input shaft is linked to a linkage gear; a third gear and a fourth gear arranged in opposite are fixed within the linkage gear; both an axis of the third gear and an axis of the fourth gear are perpendicular to a plane of an axis of the linkage gear; the linkage gear is sheathed on the output shaft, and the third gear and the fourth gear are located radially opposite each other on the output shaft, respectively; and, both the first gear and the second gear are meshed with the third gear, both the first gear and the second gear are meshed with the fourth gear, and all the first gear, the second gear, the third gear and the fourth gear are bevel gears.

3. The high-precision rear-axle reduction gearbox for a scooter according to claim 2, characterized in that two first through grooves are formed on the linkage gear; the third gear and the fourth gear are fixed within the first through grooves, respectively; both the third gear and the fourth gear are restricted between the first gear and the second gear; each of the first through grooves is communicated with one of two second through grooves; the third gear is sheathed outside a first fixed shaft and the fourth gear is sheathed outside a second fixed shaft; the two second through grooves are respectively matched with the first fixed shaft and the second fixed shaft, at least one end of each of the first or the second fixed shafts is located within one of the two second through grooves, and a portion of the first and the second fixed shaft located within the second through groove engages with one of the two the second through grooves to realize the radial fixation of the first or the second fixed shaft; and, bevel gear bearings are provided between the third gear and the first fixed shaft and between the fourth gear and the second fixed shaft.

4. The high-precision rear-axle reduction gearbox for a scooter according to claim 2, characterized in that a pin hole is formed in a portion of the first output shaft and a portion of the second output shaft both located within the box body; a first pin is fitted within the pin hole of the first output shaft, and a second pin is fitted within the pin hole of the second output shaft; bevel teeth are formed on one side end face of the first gear, and a first pin accommodating groove for accommodating the first pin is formed on the other side end face of the first gear; and, bevel teeth are formed on one side end face of the second gear, and a second pin accommodating groove for accommodating the second pin is formed on the other side end face of the second gear.

5. The high-precision rear-axle reduction gearbox for a scooter according to claim 2, characterized in that one side end face of the linkage gear engages against a positioning sleeve, while the other side end face of the linkage gear engages against the first gear or the second gear; both the positioning sleeve and the linkage gear are sheathed on a same output shaft; and the positioning sleeve is located between the first gear and the second gear.

6. The high-precision rear-axle reduction gearbox for a scooter according to claim 1, characterized in that each of the first block and the second block comprises an arc-shaped clamping portion, a hinge fixation portion at one end of the clamping portion and a fastener fixation portion at the other end of the clamping portion; a thickness of the clamping portion of the first block is consistent with a thickness of the clamping portion of the second block; a sum of a value of thickness of the hinge fixation portion of the first block and a value of thickness of the hinge fixation portion of the second block is less than or equal to the thickness of the clamping portion of the first block; the fastener fixation portion of the first block and the fastener fixation portion of the second block are fixed together to close the arc-shaped opening of the first block and the arc-shaped opening of the second block to form an inner hole having a circular cross-section in a radial direction of the output shaft; and, the wedge component is in clearance fit with the output shaft.

7. The high-precision rear-axle reduction gearbox for a scooter according to claim 1, characterized in that a first fixation portion and a second fixation portion both extending outside the box body and having a circular inner edge of a radial cross-section are formed at two opposite ends of the box body, respectively; the first output shaft is fixed with the first fixation portion by several output shaft bearings; the second output shaft is fixed with the second fixation portion by several output shaft bearings; a sleeve is sheathed on the first output shaft or the second output shaft; one end of the sleeve and the first fixation portion or the second fixation portion form stopper structures matched with each other, and the other end of the sleeve and a fixed seat form stopper structures matched with each other; the fixed seat is fixed with the first and second fixation portions; and, the sleeve is restricted between the fixed seat and the first fixation portion or the second fixation portion.

8. The high-precision rear-axle reduction gearbox for a scooter according to claim 7, characterized in that a first oil seal is provided at an end of the first fixation portion away from the second fixation portion, a second oil seal is provided at an end of the second fixation portion away from the first fixation portion, and the output shaft bearings are needle bearings.

* * * * *